United States Patent [19]
Ono et al.

[11] Patent Number: 5,216,415
[45] Date of Patent: Jun. 1, 1993

[54] METHOD OF DRIVING A MATRIX-TYPE LIQUID CRYSTAL DISPLAY DEVICE

[75] Inventors: Jyunichi Ono; Kenji Kamada; Kensaku Takata; Tohru Kashiwagi, all of Osaka; Tisato Kajiyama, Fukuoka, all of Japan

[73] Assignee: Sumitomo Electric Industries, Ltd., Osaka, Japan

[21] Appl. No.: 806,365

[22] Filed: Dec. 13, 1991

[30] Foreign Application Priority Data

Dec. 19, 1990 [JP] Japan ............................ 2-403913
Feb. 5, 1991 [JP] Japan ............................ 3-014536

[51] Int. Cl.$^5$ .................................. G09G 3/36
[52] U.S. Cl. ........................... 340/784; 340/805; 359/56
[58] Field of Search ............ 340/784, 805, 793; 359/56, 86

[56] References Cited

U.S. PATENT DOCUMENTS

| | | | |
|---|---|---|---|
| 4,571,585 | 2/1986 | Stein et al. | |
| 4,722,594 | 2/1988 | Crossland et al. | |
| 4,857,906 | 8/1989 | Conner | 340/784 |
| 4,859,035 | 8/1989 | Ichinose et al. | |
| 4,870,398 | 9/1989 | Bos | 340/805 |
| 5,010,327 | 4/1991 | Wakita et al. | 340/805 |

FOREIGN PATENT DOCUMENTS

| | | |
|---|---|---|
| 61-103124 | 5/1986 | Japan . |
| 2-127494 | 5/1990 | Japan . |
| 2-193115 | 7/1990 | Japan . |

OTHER PUBLICATIONS

Chemistry Letters, No. 5, May 1989 (Tokyo, Japan) pp. 817-820; T. Kajiyama et al. "Aggregation States and Bistable Light Switching of Liquid Crystal and Polymer/Low-molecular Weight Liquid Crystal Mixture Systems".
SID International Symposium, Baltimore (May, 1989) pp. 21-24; T. Nagata et al., "A ¼ Duty Multiplexed Ferroctric Liquid Crystal Li ht Shutter Array using ac Field-stabilization Effect".
Crossland and Canter, "An Electrically Addressed Smectic Storage Device", Society for International Display International Symposium Digest of Technical Papers, pp. 124, 127, & 185. (1985).
Nagata, M. and Nakamura, N.; Mol. Cryst. Liq. Cryst.; vol. 139; 1986; p. 143.

Primary Examiner—Ulysses Weldon
Assistant Examiner—Matthew Luu
Attorney, Agent, or Firm—Sandler, Greenblum & Bernstein

[57] ABSTRACT

A method of driving a matrix-type liquid crystal display device utilizing a liquid crystal layer sandwiched between a plurality of scanning electrodes and a plurality of signal electrodes extending generally perpendicular to the scanning electrodes, which comprises the steps of erasing a display screen by bringing it into either a light transmitting state or a light scattering state, writing by which pixels each at a point of intersection between the scanning and signal electrodes are selectively reversed in optical state, and retaining each of the pixels in the optical state once assumed immediately after the writing step. During the erasing step, all of the pixels are applied with a high alternating voltage or a high direct current voltage. During the writing step, the scanning electrodes are line-sequentially selected and the signal electrodes are applied with a signal of a waveform effective to apply a high voltage to some of the pixels desired to be reversed in optical state and a low voltage to some of the pixels desired to be retained. During the retaining step, a low alternating voltage or a low direct current voltage is applied to all of the pixels. One of the voltage wave applied to the pixels during the writing step and that applied thereto during the erasing step is high and low, respectively.

4 Claims, 10 Drawing Sheets

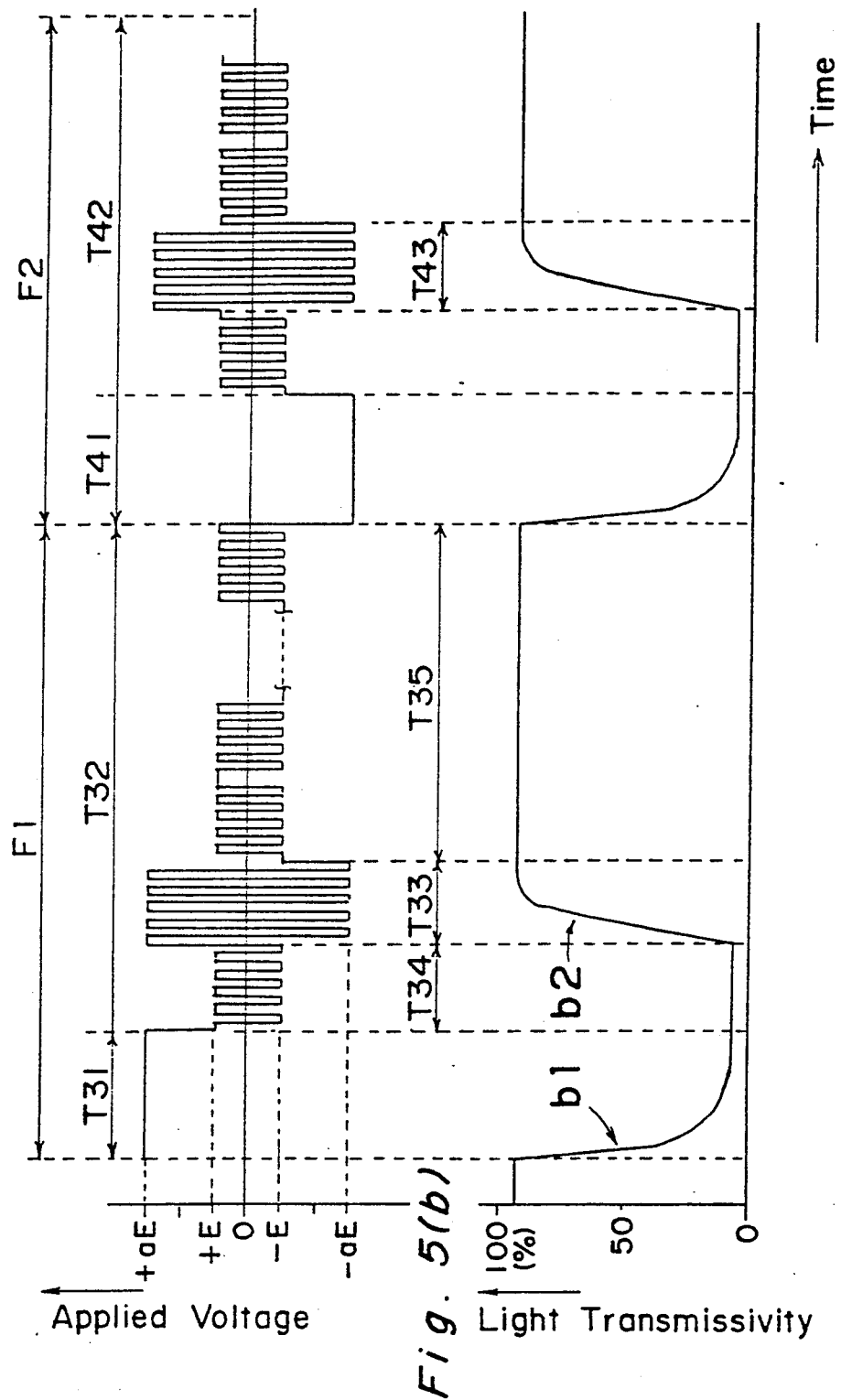

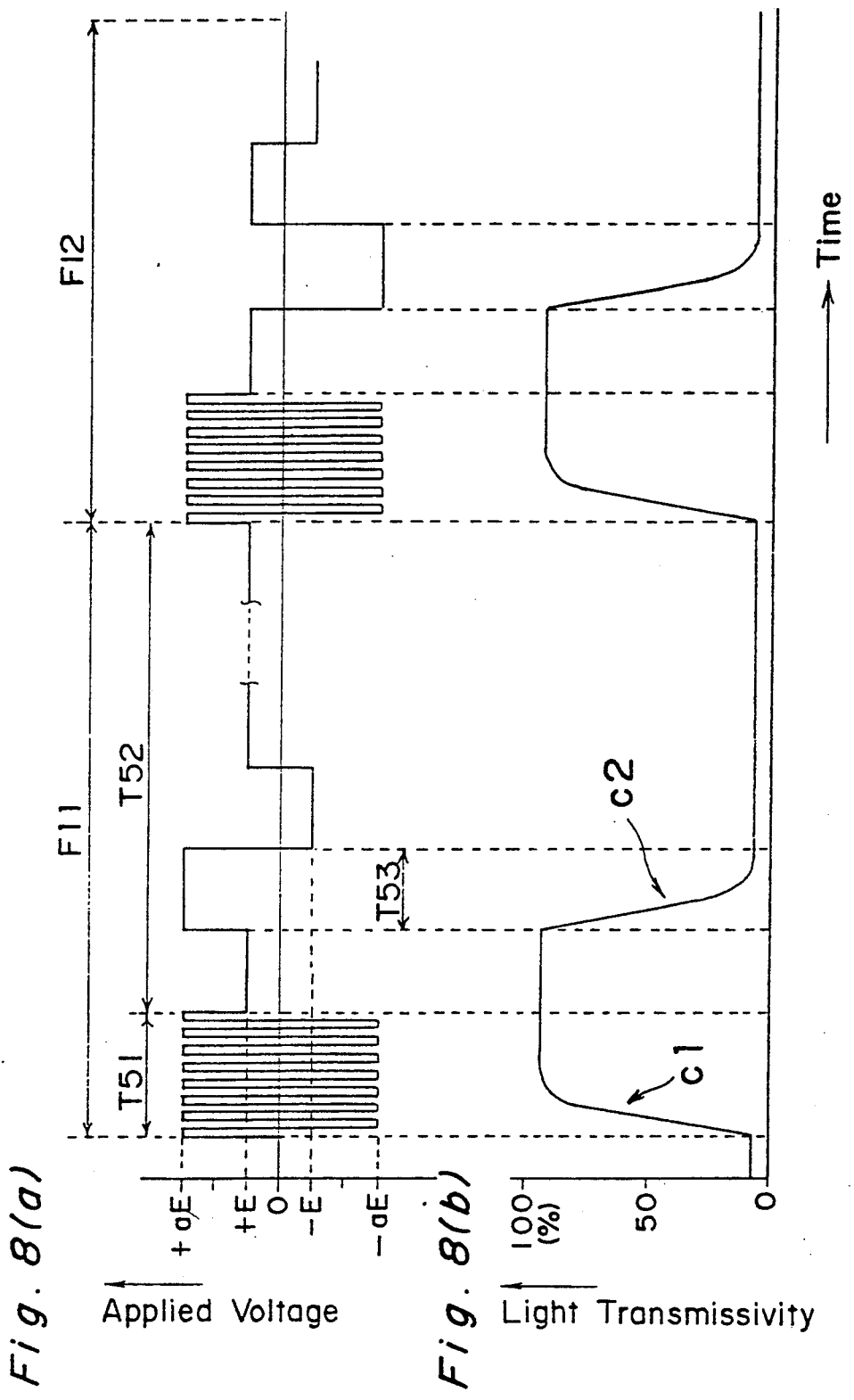

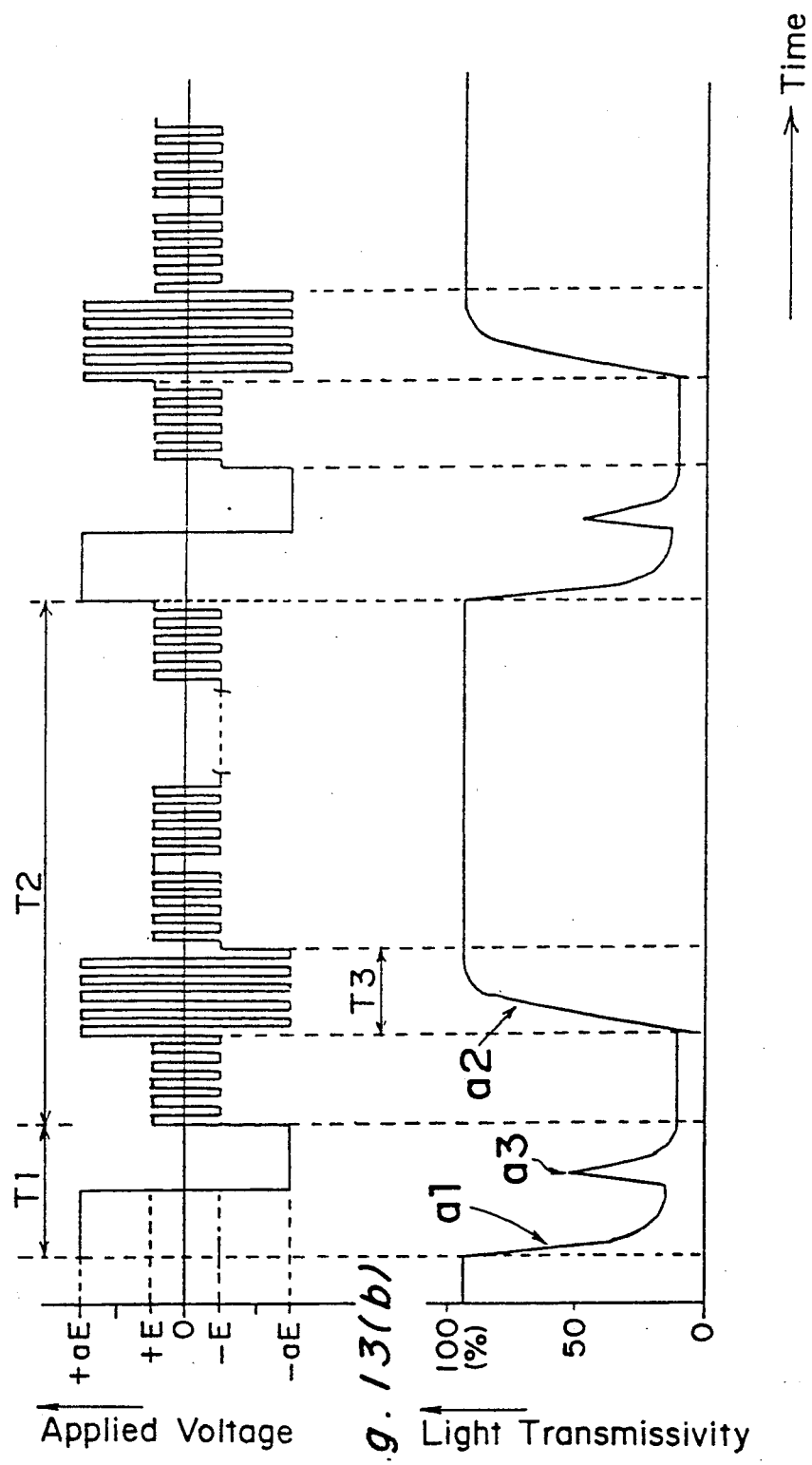

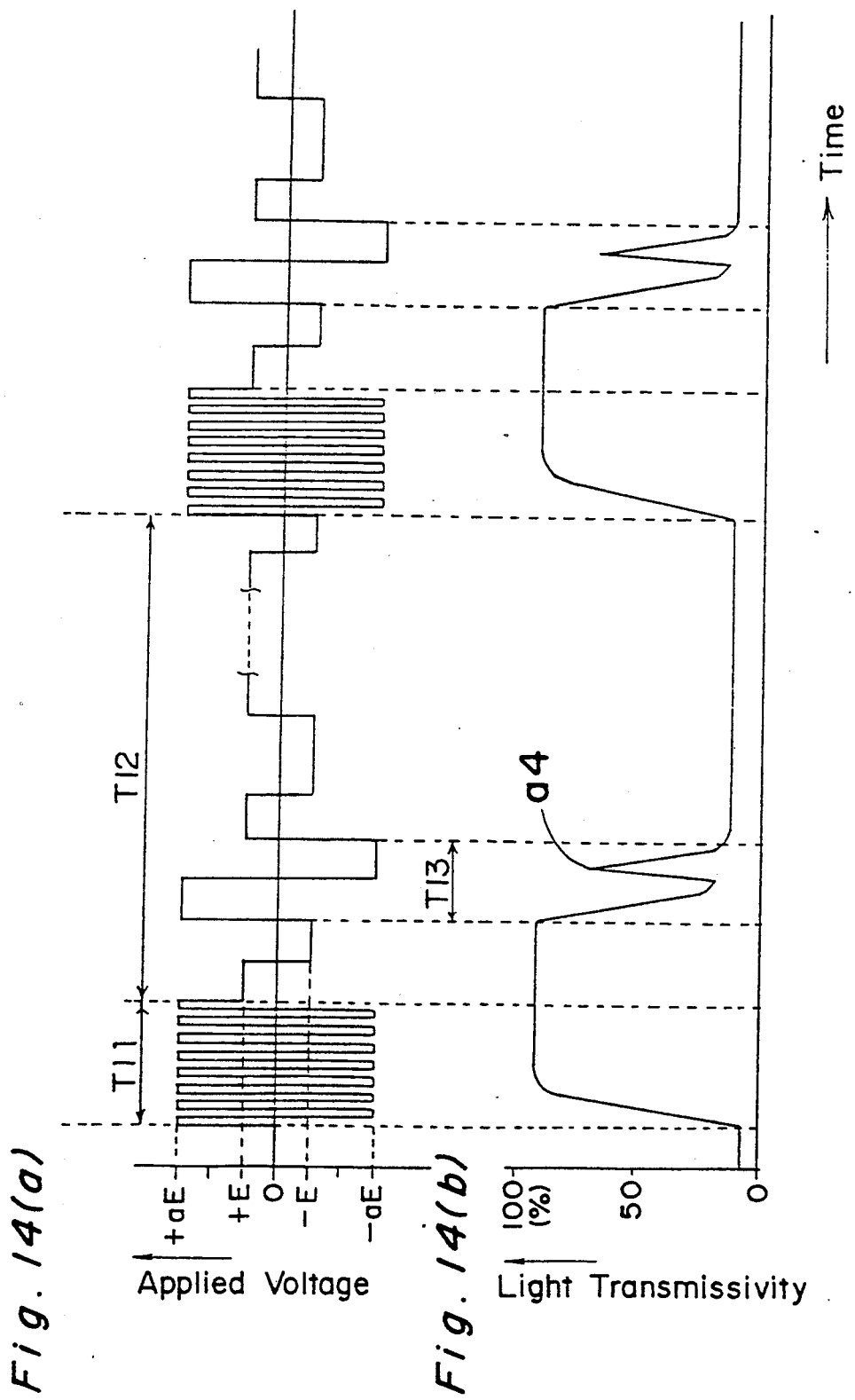

METHOD OF DRIVING A MATRIX-TYPE LIQUID CRYSTAL DISPLAY DEVICE

BACKGROUND OF THE INVENTION

1. Field of the Invention

The present invention relates to a method of driving a liquid crystal display device of a type utilizing a liquid crystal layer made of a mixture of liquid crystal of a high molecular weight with liquid crystal of a low molecular weight and having a so-called memory effect.

2. Description of the Prior Art

In a conventional liquid crystal display device of a type utilizing a twisted nematic (TN) liquid crystal material or a super twisted nematic (STN) liquid crystal material, a plurality of scanning electrodes and a corresponding number of signal electrodes are formed on respective surface of paired substrates so as to extend perpendicular to each other with a layer of liquid crystal material sandwiched between the substrates. To drive this liquid crystal display device, a voltage averaging method is largely employed in which a voltage is applied to the scanning electrodes on a time-sharing basis so that a voltage can be selectively applied to the liquid crystal material forming a pixel at a point of intersection between the scanning and signal electrodes.

It has, however, been found that, in the practice of this driving method, if the number of the scanning electrodes to which the voltage is applied on the time-sharing basis is increased, the length of time required to select one scanning electrode tends to be increased with the consequence that the length of time during which no scanning electrode is selected increases. As a result thereof, the difference in average voltage applied for each frame between an ON pixel and an OFF pixel decreases to such an extent that a display contrast may decreases.

On the other hand, if a liquid crystal material having a memory effect by which, even though the voltage applied is removed, the state (either a light transmitting state or a light scattering state) once assumed during the application of the voltage can be retained is used, the above discussed problem may be eliminated. In other words, if a simple matrix-type liquid crystal display device is constructed with the use of the liquid crystal material having the memory effect, each of the pixels can retain the previously assumed state even though no voltage is applied thereto, and therefore, any reduction in display duty which may occur when the number of the scanning electrodes is increased will not result in a reduction in display contrast, making it possible to provide the liquid crystal display device having a large display capacity. That is to say, since each pixel can be assuredly controlled as to its state (either ON state or OFF state) even during a period in which no voltage is applied thereto, it is possible to increase the display capacity without inviting any reduction in display contrast.

The simple matrix-type liquid crystal display device utilizing the liquid crystal material having the memory effect is disclosed in, for example, the Japanese Laid-open Patent Publication No. 61-103124 and by W. A. Crossland and S. Canter in '85 Society for Information Display International Symposium Digest of Technical Papers, pp. 124–127, (1985), Session: 8.2. According to those literature, a ferroelectric liquid crystal material or smectic dynamic scattering liquid crystal material is utilized and, by the utilization of the memory effect possessed by this specific liquid crystal material, a display is effected by means of a simple matrix driving.

However, in the above described liquid crystal display device, the manufacture is complicated and difficult because, in the case where the ferroelectric liquid crystal material is employed, an adjustment of cell gaps to the submicron order is required and because, in the case where the smectic dynamic scattering liquid crystal material is employed, an application of the voltage in excess of 100 volts is required. Therefore, the liquid crystal display device utilizing any one of the ferroelectric liquid crystal material and the smectic dynamic scattering liquid crystal material has not yet been placed on the market.

Apart from the foregoing, a liquid crystal display device wherein a liquid crystal layer is made of a mixture of liquid crystal of a high molecular weight with liquid crystal of a low molecular weight to accomplish the above described memory effect has recently been suggested, for example, by T. Kajiyama et al. in Chemistry Letters, pp. 817–820, 1989, and also in the Japanese Laid-open Patent Publications No. 2-127494 and No. 2-193115. The liquid crystal layer so suggested is of a type which, when a relatively high voltage of a high frequency (for example, 1 kHz) is applied, it assumes a light transmitting state in which the incident rays of light can pass therethrough, but when a relatively high voltage of a low frequency (for example, 1 Hz to a direct current) is applied, it can assume a light scattering state in which the incident rays of light can be scattered. Also, under a condition in which a relatively low voltage is applied, the previously assumed state (either the light transmitting state or the light scattering state) can be retained.

Thus, where the simple matrix-type liquid crystal display device is constructed using the liquid crystal layer made of the above described mixture, one of the light transmitting state, the light scattering state and the memory state can be selected and, therefore, the liquid crystal display device having a large display capacity and capable of exhibiting a high display contrast such as described hereinbefore can readily be realized.

However, when the use is made of the above described mixture for the liquid crystal layer in making the simple matrix-type liquid crystal device and the memory effect of the liquid crystal layer is to be utilized, it is necessary to bring each pixel into one of the light transmitting state and the light scattering state and also to bring a pixel corresponding to some of the scanning electrodes, which are not selected, into the memory state. This in turn necessitates a switching of one of two types of frequencies and also to employ different voltages to be applied to the pixels corresponding to the selected scanning electrodes and to be applied to the pixels corresponding to the non-selected scanning electrodes, respectively.

A simple matrix driving method in which signals having two frequencies are employed is disclosed, for example, by M. Nagata and N. Nakamura in Mol. Cryst. Liq. Cryst, Vol. 139 (1986), pp 143. However, this method is not a method for controlling the pixels into one of the ON, OFF and memory states and causes the pixels corresponding to the non-selected scanning electrodes to be brought into one of the ON and OFF states. Therefore, the memory effect possessed by the liquid crystal material such as described above is not utilized.

Thus, in the liquid crystal display device having the liquid crystal layer made of the above described mixture, a driving method effective to maximize the utilization of the memory effect of the liquid crystal layer has not hitherto been known and, therefore, it has been recognized difficult to realize the matrix-type liquid crystal display device wherein the above described mixture is used in the liquid crystal layer.

SUMMARY OF THE INVENTION

The present invention has been developed with a view to substantially eliminate the above discussed problems and is intended to provide a method of driving a liquid crystal display device, which method makes it possible to realize the matrix-type liquid crystal display device of a type comprising a liquid crystal layer made of a mixture of liquid crystal of a high molecular weight with liquid crystal of a low molecular weight and capable of utilizing a memory effect possessed by the liquid crystal layer.

Another important object of the present invention is to provide a method of driving the matrix-type liquid crystal display device of the type referred to above, which method is effective to drive the matrix-type liquid crystal display device by the utilization of the memory effect of the liquid crystal layer thereby to increase a display contrast.

In order to accomplish the foregoing and other objects of the present invention, a driving method according to one aspect of the present invention is particularly applicable to a matrix-type liquid crystal display device which comprises a liquid crystal layer made of a mixture of liquid crystal of a high molecular weight with liquid crystal of a low molecular weight and capable of assuming one of a light transmitting state, when an alternating voltage of an effective value higher than a predetermined voltage and having a frequency higher than a predetermined value is applied thereto, and a light scattering state when either an alternating voltage of an effective value higher than the predetermined voltage and having a frequency not higher than the predetermined value or a direct current voltage of a value higher than the predetermined value is applied thereto, said liquid crystal layer capable of retaining at least for a predetermined length of time one of the light transmitting and scattering states, which has previously been assumed, when a voltage not higher than the predetermined value is applied thereto; a plurality of scanning electrodes and a plurality of signal electrodes positioned on respective sides of the liquid crystal layer so as to extend generally perpendicular to each other while sandwiching the liquid crystal layer therebetween; and a pixel formed at a point of intersection between each of the scanning electrodes and each of the signal electrodes and capable of assuming a light transmitting state or a light scattering state to accomplish a display when signals of predetermined waveforms are applied to the associated scanning and signal electrodes.

According to the present invention, the driving method applicable to the liquid crystal display device of the type referred to above comprises the steps of:

erasing the display by applying either the alternating voltage of the effective value higher than the predetermined voltage or the direct current voltage higher than the predetermined value to all of the pixels to bring an entire display screen in either a light transmitting state or a light scattering state;

writing the display by applying a scanning signal of a predetermined waveform while line sequentially selecting the plural scanning electrodes and also by applying a signal of a waveform effective to apply to each of the signal electrodes either the alternating voltage of the effective value higher than the predetermined voltage or the direct current voltage higher than the predetermined value to the liquid crystal layer by a relationship between the signal to be applied to the signal electrodes and the scanning signal during a period in which some of the scanning electrodes corresponding to some of the pixels of which optical state is to be changed are selected, but applying a signal of a waveform effective to apply to each of the signal electrodes either the alternating voltage of the effective value not higher than the predetermined voltage or the direct current voltage not higher than the predetermined value to the liquid crystal layer by a relationship between the signal to be applied to the signal electrodes and the scanning signal during a period in which some of the scanning electrodes corresponding to some of the pixels of which optical state is to be retained are selected, thereby to selectively vary respective optical states of the pixels forming the display screen; and causing each of the pixels to retain the previously assumed state by applying either the alternating voltage of the effective value not higher than the predetermined value or the direct current voltage not higher than the predetermined value to all of the pixels;

wherein one of a voltage wave applied to each of the pixels during the erasing step and a voltage wave applied to some of the pixels of which optical state is to be changed during the writing step has a frequency higher than the predetermined value and the other of the voltage waves has a frequency not higher than the predetermined value.

Each of the voltage to be applied to the pixels during the erasing step and the voltage to be applied to some of the pixels of which optical state is changed during the writing step is preferably of a value twice to three times the voltage applied to the pixels during the causing step or the voltage applied to such some of the pixels of which optical state is retained during the writing step.

Thus, according to the foregoing aspect of the present invention, a combination of the erasing operation for erasing the entire display, the writing operation for writing an image onto the display screen and the retaining operation for causing each of the pixels to retain the optical state once assumed immediately after the image writing makes it possible to realize the matrix-type liquid crystal display device. By way of example, let it be assumed that the image writing is carried out by erasing the display screen by bringing the display screen into the light transmitting state and by reversing the pixels selectively to the light scattering state. In this case, the erasing operation can be accomplished by applying to all of the pixels the alternating voltage of the effective value higher than the predetermined voltage and having the frequency higher than the predetermined value so that respective portions of the liquid crystal layer made of the mixture of the liquid crystal of a high molecular weight with the liquid crystal of a low molecular weight, which portions correspond respectively to the pixels, can be brought into the light transmitting state.

On the other hand, during the writing operation, one of the plural scanning electrodes is line-sequentially selected. When some of the scanning electrodes corresponding to some of the pixels desired to be brought into the light scattering state are selected, the signal of a predetermined waveform is applied to each of the signal electrodes by a relationship between the signal to be applied to the signal electrodes and the signal applied to the scanning electrodes so that either the alternating voltage of the effective value higher than the predetermined voltage and having the frequency not higher than the predetermined value or the direct current voltage higher than the predetermined value can be applied to such some of the pixels. On the other hand, when some of the scanning electrodes corresponding to some of the pixels desired to be brought into the light transmitting state are selected, the signal of a predetermined waveform is applied by the relationship between the the signal applied to the scanning electrodes and the signal applied to the signal electrodes so that either the alternating voltage of the effective value not higher than the predetermined voltage or the direct current voltage not higher than the predetermined value can be applied to such some of the pixels. In this way, the respective optical states of the pixels can be selectively reversed thereby to accomplish the image writing.

Also, during the retaining operation, the signals of the predetermined waveforms are applied to the scanning and signal electrodes so that either the alternating voltage of the effective value not higher than the predetermined voltage or the direct current voltage not higher than the predetermined value can be applied to all of the pixels, thereby causing all of the pixels to retain the previously assumed optical state, either the light transmitting state or the light scattering state.

Where the erasure of the display is desired to be carried out by bringing the display screen into the light scattering state and the display is desired to be carried out by bringing the pixels selectively into the light transmitting state, the frequency of the voltage waveform to be applied to the pixels during the erasing operation and the frequency of the voltage waveform to be applied to some of the pixels of which optical state should be reversed during the writing operation are preferably selected to be lower and higher than the above described predetermined frequency, respectively.

The driving method according to another aspect of the present invention is particularly applicable to a matrix-type liquid crystal display device which comprises a liquid crystal layer made of a mixture of liquid crystal of a high molecular weight with liquid crystal of a low molecular weight and capable of assuming one of a light transmitting state, when an alternating voltage of an effective value higher than a predetermined voltage and having a frequency higher than a predetermined value is applied thereto, and a light scattering state when either an alternating voltage of an effective value higher than the predetermined voltage and having a frequency not higher than the predetermined value or a direct current voltage of a value higher than the predetermined value is applied thereto, said liquid crystal layer capable of retaining at least for a predetermined length of time one of the light transmitting and scattering states, which has previously been assumed, when a voltage not higher than the predetermined value is applied thereto; a plurality of scanning electrodes and a plurality of signal electrodes positioned on respective sides of the liquid crystal layer so as to extend generally perpendicular to each other while sandwiching the liquid crystal layer therebetween; and a pixel formed at a point of intersection between each of the scanning electrodes and each of the signal electrodes and capable of assuming a light transmitting state or a light scattering state to accomplish a display when voltage signals are applied to the associated scanning and signal electrodes.

According to such another aspect of the present invention, the driving method applicable to the liquid crystal display device of the type referred to above comprises the steps of:

applying between the scanning and signal electrodes either the alternating voltage of the effective value higher than the predetermined voltage or the direct current voltage higher than the predetermined value to bring all of the pixels into either a light transmitting state or a light scattering state thereby to erasure an entire display screen;

writing the display by applying a scanning signal of a predetermined waveform while line sequentially selecting the plural scanning electrodes and also by applying a signal of a waveform effective to apply to each of the signal electrodes either the alternating voltage of the effective value higher than the predetermined voltage or the direct current voltage higher than the predetermined value to the liquid crystal layer by a relationship between the signal to be applied to the signal electrodes and the scanning signal during a period in which some of the scanning electrodes corresponding to some of the pixels of which optical state is to be changed are selected, but applying a signal of a waveform effective to apply to each of the signal electrodes either the alternating voltage of the effective value not higher than the predetermined voltage or the direct current voltage not higher than the predetermined value to the liquid crystal layer by the relationship between the signal to be applied to the signal electrodes and the scanning signal during a period in which some of the scanning electrodes corresponding to some of the pixels of which optical state is to be retained are selected, thereby to selectively vary respective optical states of the pixels forming the display screen; and causing each of the pixels to retain the previously assumed state by applying either the alternating voltage of the effective value not higher than the predetermined value or the direct current voltage not higher than the predetermined value to all of the pixels;

wherein one of a voltage wave applied to each of the pixels during the erasing step and a voltage wave applied to some of the pixels of which optical state is to be changed during the writing step has a frequency higher than the predetermined value whereas the other of the voltage waves is a direct current of a voltage which does not vary at least during the period, in which the optical state of the pixels is changed, and of a waveform varying in polarity for each picture being displayed.

Each of the voltage to be applied to the pixels during the erasing step and the voltage to be applied to some of the pixels of which optical state is changed during the writing step is preferably of a value twice to three times the voltage applied to such some of the pixels of which optical state is retained during the writing step.

Thus, according to the second mentioned aspect of the present invention, a combination of the erasing operation for erasing the entire display makes it possible to realize the matrix-type liquid crystal display device. By way of example, let it be assumed that the image writing is carried out by erasing the display screen by bringing the display screen into the light scattering state and by reversing the pixels selectively to the light transmitting state. In this case, the erasing operation can be accomplished by applying the direct current voltage which is not lower than the predetermined value and which does not vary during the erasing operation so that respective portions of the liquid crystal layer made of the mixture of the liquid crystal of a high molecular weight with the liquid crystal of a low molecular weight, which portions correspond respectively to the pixels, can be brought into the light scattering state.

The direct current voltage applied to the pixels during the erasing operation has its polarity reversed for each picture to be displayed. Accordingly, considering the sequence of successive pictures to be displayed, an AC drive may be said to be accomplished and no undesirable electrolysis of liquid crystal molecules will occur.

On the other hand, during the writing operation, the plural scanning electrodes are line-sequentially selected. When some of the scanning electrodes corresponding to some of the pixels desired to be brought into the light transmitting state are selected, the signal of a predetermined waveform is applied to each of the signal electrodes by a relationship between the signal to be applied to the signal electrodes and the signal applied to the scanning electrodes so that the alternating voltage of the effective value higher than the predetermined voltage and having the frequency higher than the predetermined value can be applied to such some of the pixels. On the other hand, when some of the scanning electrodes corresponding to some of the pixels desired to be brought into the light scattering state are selected, the signal of a predetermined waveform is applied by the relationship between the signal to be applied to the signal electrodes and the signal applied to the scanning electrodes so that either the alternating voltage of the effective value not higher than the predetermined voltage or the direct current voltage not higher than the predetermined value can be applied to such some of the pixels. In this way, the respective optical states of the pixels can be selectively reversed thereby to accomplish the image writing.

Where the erasure of the display is desired to be carried out by bringing the display screen into the light transmitting state and the display is desired to be carried out by bringing the pixels selectively into the light scattering state, the frequency of the voltage waveform to be applied to the pixels during the erasing operation is preferably selected to be higher than the above described predetermined frequency. On the other hand, the frequency of the voltage waveform to be applied to some of the pixels of which optical state should be reversed during the writing operation is preferably selected to be a direct current voltage of a value which does not vary at least during a period in which the optical state of each of such some of the pixels to be reversed is varied, for example, during a period in which such some of the scanning electrodes corresponding to such some of the pixels are selected). The direct current voltage to be applied during this writing operation to such some of the pixels is reversed in polarity for each picture, thereby avoiding any possible undesirable electrolysis of the liquid crystal molecules.

It is to be noted that, in the practice of the method according to the second mentioned aspect of the present invention, each of the voltage to be applied to the pixels during the erasing step and the voltage to be applied to some of the pixels of which optical state is changed during the writing step is preferably of a value twice to three times the voltage applied to such some of the pixels of which optical state is changed during the writing step. By so selecting, not only can the voltage applied when the optical state of the pixels is to be retained be rendered to be of a value lower than the predetermined voltage, but also the optical state of the pixels can quickly be changed in a short length of time by the application of the higher voltage when the optical state is so desired to be changed.

BRIEF DESCRIPTION OF THE DRAWINGS

These and other objects and features of the present invention will readily be understood from the following description of preferred embodiments thereof taken with reference to the accompanying drawings, in which:

FIGS. 5a and 5b is a diagram used to explain a display operation;

FIGS. 8a and 8b is a diagram used to explain the display operation;

FIGS. 13(a)-13(b) and 14(a)-14(b) are diagrams used to explain the driving method according to yet further embodiments of the present invention, respectively.

DETAILED DESCRIPTION OF THE EMBODIMENTS

Figure 2:
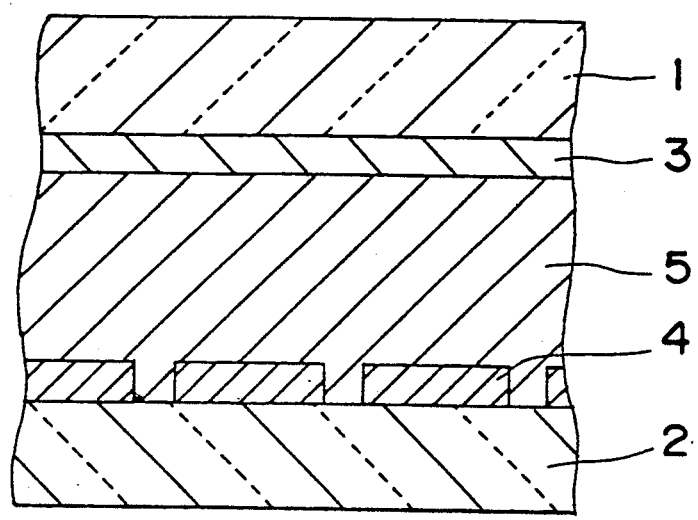
FIG. 2 is a fragmentary sectional view of the liquid crystal display device to which the driving method of the present invention is applicable.

Referring first to FIG. 2, there is shown, in a fragmentary sectional representation, a basic structure of a liquid crystal display device adapted to be driven by a drive method according to one embodiment of the present invention. The liquid crystal display device shown therein comprises a pair of first and second transparent substrates 1 and 2 positioned one above the other in spaced relationship with each other; a plurality of striped scanning electrodes 3 each in the form of a transparent electrode film and deposited on one surface of the first substrate 1, which confronts the second substrate 2; a plurality of striped signal electrodes 4 each in the form of a transparent electrode film and deposited on one surface of the second substrate 2, which confronts the first substrate 1; and a layer 5 of liquid crystal filled up in a space between the first and second substrates 1 and 2. The scanning and signal electrodes 3 and 4 are so patterned on the respective surfaces of the first and second substrates 1 and 2 as to extend perpendicular to each other with a pixel formed at each intersection between the scanning and signal electrodes 3 and 4.

The liquid crystal layer 5 is prepared from a mixture of a high molecular weight liquid crystal of a kind containing, as a main chain, siloxane and, as a side chain, a radical capable of exhibiting a liquid crystalline property, with a low molecular weight liquid crystal capable of exhibiting a nematic characteristic. An example of this mixture includes, for example, a mixture of poly-(4-cyanophenyl-4'-hexyloxbenzoate methylcyloxane with a commercially available material identified by "E63" manufactured and sold by Merc, Japan, Inc.

The liquid crystal layer 5 of the above described composition can be held in a light transmitting state (with 80% or higher light transmissivity) when an alternating voltage having a frequency (for example, 1 kHz) higher than a predetermined frequency (for example, 100 Hz) and also having an effective voltage (for example, 90 volts) higher than a predetermined voltage (for example, 50 volts) is applied between the scanning and signal electrodes 3 and 4, but can be held in a light scattering state (with 50% or lower light transmissivity) when a high electric voltage having a relatively low frequency (1 Hz to a direct current) and also having an effective voltage higher than the above described predetermined voltage is applied between the scanning and signal electrodes 3 and 4. Thus, the liquid crystal layer 5 allows the passage of the incident light therethrough when in the light transmitting state, but scatters the incident light when in the light scattering state. However, when a voltage (for example, 30 volts) lower than the above described predetermined voltage is applied, the liquid crystal layer 5 can retain one of the light transmitting and scattering stages which has been held previously. In other words, the liquid crystal layer 5 of the above described composition has a memory property. It is to be noted that the specific values of the frequency and the voltage referred to above may vary depending on the composition of the liquid crystal layer 5.

The liquid crystal layer 5 of the above described composition has a film forming capability and can, therefore, assume a film-like shape when a liquid crystal material is applied on the surface of the first substrate 1 on which the scanning electrodes 3 have already been formed. Since the liquid crystal layer 5 has a self-retentivity, cells of relatively large surface area can readily be manufactured with a cell gap controlled strictly and with no need to spread spacers on the substrate such as required where the liquid crystal material in a liquid form is employed. Also, any adjustment of the cell gap to a submicron order and the use of orientation films used to accomplish a monodomain, such as required during the manufacture of cells utilizing a ferroelectric liquid crystal material, are not required. Moreover, since the liquid crystal layer 5 contains a nematic liquid crystal in a liquid form, the local viscosity of the liquid crystal layer is low and the liquid crystal layer can be driven at a voltage lower than that required for driving smectic dynamic scattering type cells utilizing a smectic liquid crystal having a relatively high crystalline property.

Each of the first and second substrates 1 and 2 may be either a transparent glass plate or a transparent resinous film. However, since the liquid crystal layer 5 has the film forming capability as hereinbefore described, the use of the transparent resinous film is advantageous in that the liquid crystal display device can be made light-weight and thin in thickness and also in that it makes possible to manufacture a flexible liquid crystal display device. Examples of the transparent resinous film for each of the first and second substrates 1 and 2 includes films of polyethylene terephthalate, polyethylene naphthalate and polyether sulphone. On the other hand, a transparent electrode film forming each of the scanning and signal electrodes 3 and 4 may be a film of either indium-tin oxide (ITO) or tin oxide.

Figure 1:
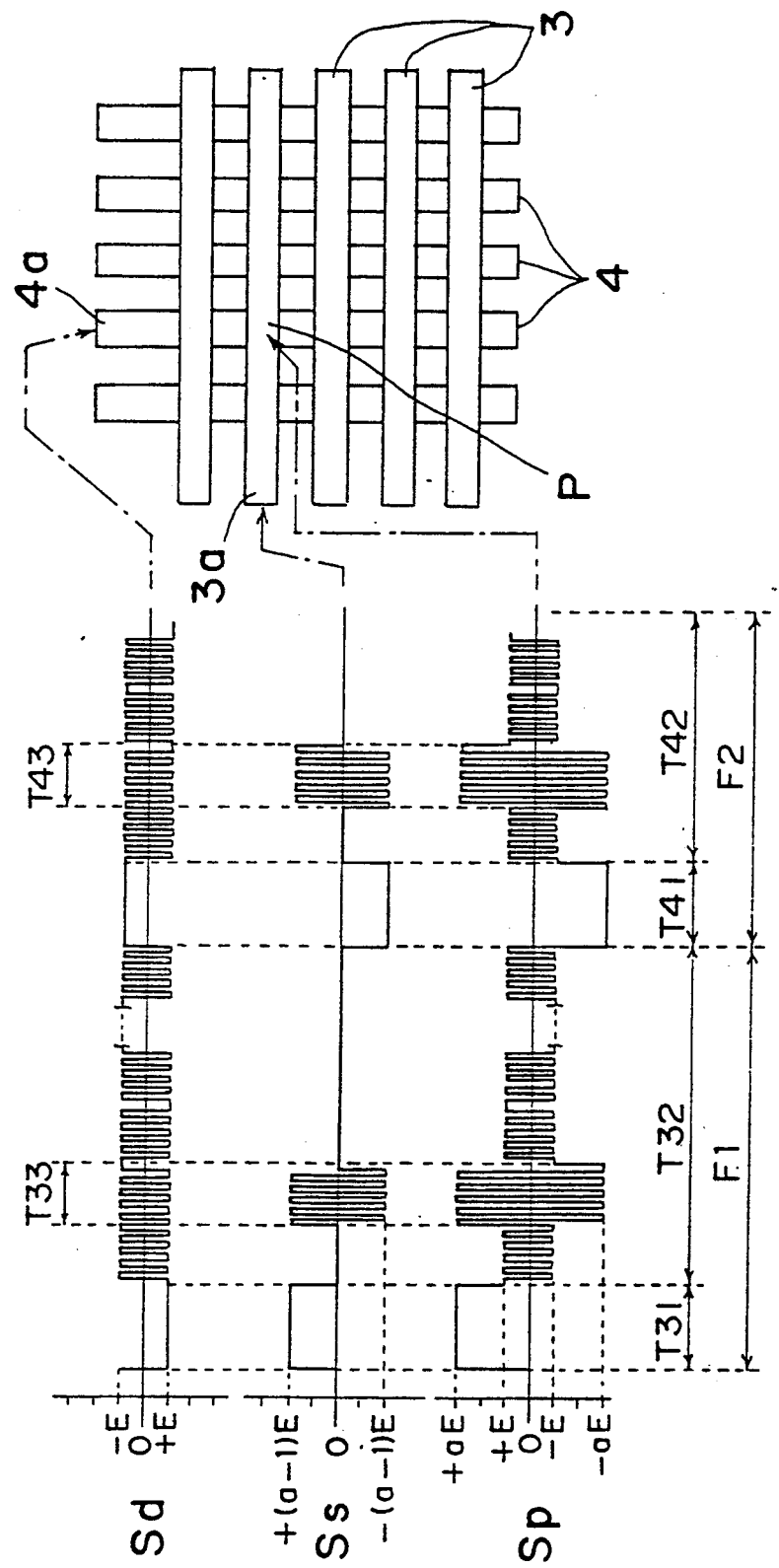
FIG. 1 is a conceptual diagram used to explain an operation of a driving method for driving a liquid crystal display device according to the present invention.

FIG. 1 illustrates, in a plan representation, the scanning and signal electrodes 3 and 4 used in the liquid crystal display device of the type referred to above. FIG. 1 also illustrates waveforms of respective signals Ss and Sd applied to one scanning electrode 3a and one signal electrode 4a and also a waveform of a voltage Sp applied to one pixel P formed at the point of intersection between the scanning and signal electrodes 3a and 4a, for the purpose of a description of the driving method according to the present invention. While for the purpose of brevity only five scanning electrodes 3 and an equal number of the signal electrodes 4 are illustrated in FIG. 1, the liquid crystal display device in practice has 50 to 200 scanning electrodes 3 and a corresponding number of the signal electrodes 4. In general, the number of the scanning or signal electrodes employable in practice varies with characteristics of the liquid crystal layer.

The scanning and signal electrodes 3 and 4 are applied, from an external drive circuit (not shown in FIG. 1), signals of predetermined waveforms corresponding the a content desired to be displayed, so that each of the pixels formed at respective points of intersection between the scanning and signal electrodes 3 and 4 can be driven to assume one of the light transmitting and scattering states thereby to accomplish a display. Such a display operation includes, according to the embodiment of the present invention, an erasing operation, in which an entire display screen is initialized to a light scattering state to erase a display content and a writing operation in which some of the pixels are reversed to assume the light transmitting state, while the remaining pixels are held in the light scattering state, thereby to effect a display of an image desired to be displayed.

The pixel P to which the scanning signal of the waveform Ss and the signal of the waveform Sd are respectively applied through the scanning electrode 3a and the signal electrode 4a responds to a voltage of the waveform Sp corresponding to a difference between the waveforms Ss and Sd. This voltage of the waveform Sp contains a high frequency component of a frequency (for example, 1 kHz) higher than the predetermined frequency (for example, 100 Hz) and a direct current component of a constant voltage. Any one of periods T31 and T41 during which a direct current voltage is applied to the pixel represent a period during which the entire display is erased and, during such period, the direct current voltage of aE or −aE (wherein a is, for example, 3 and E is, for example, 30 volts) is applied to render the pixel P to assume the light scattering state. In other words, the application of a sufficiently high direct current voltage causes a turbulent flow in the liquid crystal layer 5 due to movement of ions and, because of this, the rays of light entering the liquid crystal layer 5 are scattered (or clouded white) causing the pixel to assume the light scattering state. It is however to be noted that the direct current voltage applied during the period T31 is reverse in polarity to that of the direct current voltage applied during the period T41. On the other hand, during any one of periods T33 and T43 during which an alternating current voltage of high effective voltage aE is applied, which periods are included respectively within associated periods T32 and T42 during which the high frequency alternating voltage is applied to the pixel P, liquid crystal molecules forming the liquid crystal layer 5 are oriented homeotropic by the application of the high frequency voltage, thereby causing the pixel P to reverse from the light scattering state to the light transmitting state. During a period in which the alternating voltage of a relatively low effective voltage E is applied, which period is included in any one of the periods T32 and T42, the pixel P is retained in the state which has previously been assumed.

Figure 3:
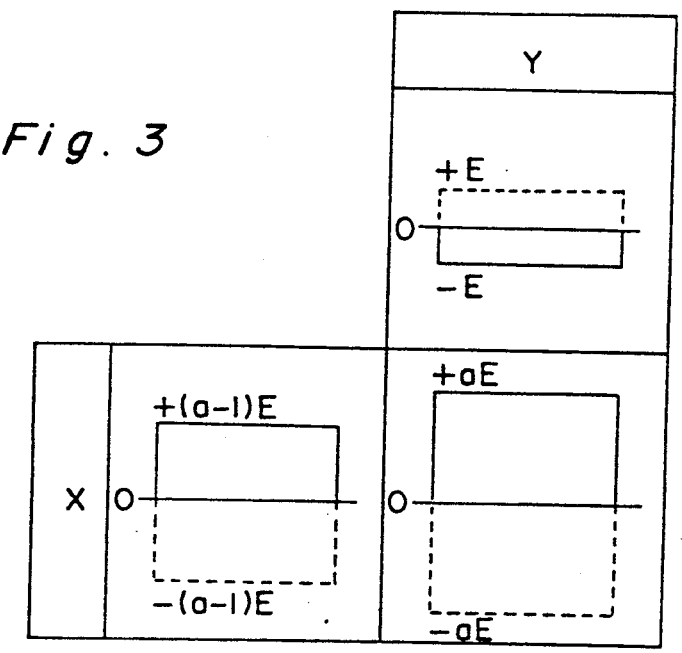
FIG. 3 is a diagram showing waveforms of signals applied to scanning and signal electrodes and a waveform of a voltage applied to a corresponding pixel.

FIG. 3 illustrates waveforms of the signals applied respectively to the scanning and signal electrodes 3a and 4a during the above described erasing operation and a waveform of the voltage applied to the pixel P at the point of intersection between the electrodes 3a and 4a to which the respective signals of the waveforms shown therein have been applied. When the signal of the waveform shown in a row X is applied to the scanning electrode 3a and the signal of the waveform shown in a column Y is applied to the signal electrode 4a, a voltage of the waveform shown in a block at an intersection between the row X and the column Y is applied to the pixel P. In other words, the direct current voltage of a value $(a-1)E$, which does not vary during the erasing period T31, is applied from the scanning electrode 3a and the direct current voltage of a value E and of a polarity reverse to that of the signal applied to the scanning electrode 3a is applied from the signal electrode 4a. By way of example, if an erasure of a display during a display of one picture is carried out by the application of a signal shown by the solid line in FIG. 3, an erasure of a display during a display of the next succeeding picture can be carried out by the application of a signal shown by the phantom line in FIG. 3. In other words, the scanning and signal electrodes 3a and 4a are applied with respective signals each having a polarity reversed for each picture and, consequently, the pixel P is applied with the direct current voltage aE of a polarity reversed for each picture.

It is to be noted that, during the erasing period T31, all of the scanning electrodes 3 are applied equally with the signal of the waveform shown in the row X in FIG. 3 and all of the signal electrodes 4 are applied equally with the signal of the waveform shown in the column Y in FIG. 3. Accordingly, all of the pixels forming a display screen can be simultaneously reversed from the light transmitting state to the light scattering state at a time.

Figure 4:
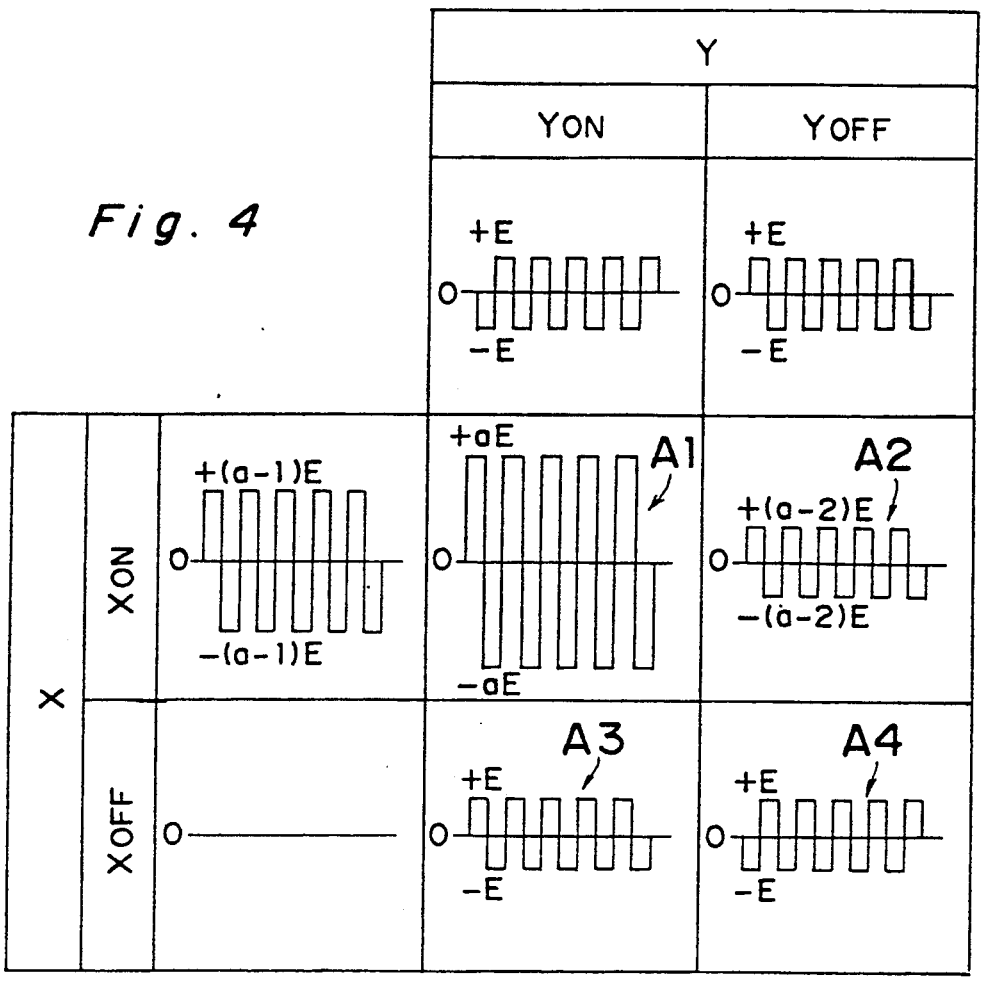
FIG. 4 is a diagram showing waveforms of signals applied to scanning and signal electrodes and a waveform of a voltage applied to a corresponding pixel.

FIG. 4 illustrates waveforms of the signals applied respectively to the scanning and signal electrodes 3 and 4 during the above described writing operation and waveforms of the voltages applied to the pixels P at the point of intersection between the electrodes 3 and 4 to which the respective signals of the waveforms shown therein have been applied. The waveforms in FIG. 4 are depicted in a manner similar to those in FIG. 3 and, thus, it will readily be understood that, when the signals of the waveforms shown in the row X and the column Y are applied respectively to the electrodes 3 and 4, the voltages of the respective waveforms shown at intersection between the row X and the column Y are applied to the pixels at respective points of intersection between the scanning and signal electrodes 3 and 4.

The plural scanning electrodes 3 are line-sequentially selected and, when selected, each scanning electrode 3 is applied with a scanning signal $X_{ON}$ is applied, but when not selected, each scanning electrode 3 is applied with a scanning signal $X_{OFF}$. The signal electrodes 4 are applied with a signal $Y_{ON}$ during a period in which some of the scanning electrodes 3 corresponding to the pixels desired to be held in the light transmitting state (ON state) on such signal electrodes 4 are selected, but with a signal $Y_{OFF}$ during a period in which some of the scanning electrodes 3 corresponding to the pixels desired to be held in the light scattering state (OFF state) are selected.

In the embodiment now under discussion, the scanning signal $X_{ON}$ applied to the line sequentially selected scanning electrodes 3 is of a sufficiently high frequency (for example, 1 kHz) and is of a bipolar rectangular wave having an effective voltage $(a-1)E$ (for example, 60 volts when a is 3 and E is 30 volts). The scanning signal $X_{OFF}$ applied to some of the scanning electrodes 3 which are not selected (hereinafter referred to as "non-selected scanning electrodes") is a direct current signal of 0 volt and, hence, no voltage is applied to the non-selected scanning electrodes 3. Considering a single scanning electrode 3a, the signal $X_{ON}$ is applied thereto during a period T33 included in the writing period T31 (See FIG. 1) and the signal $X_{OFF}$ is applied thereto during the remaining period included in the writing period T32.

On the other hand, the signal $Y_{ON}$ applied during the period in which some of the scanning electrodes 3 corresponding to some of the pixels desired to be held in the light transmitting state (ON state) on each of the signal electrodes 4 is of an effective voltage E and is of a bipolar rectangular wave opposite in phase to the scanning signal $X_{ON}$. The signal $Y_{OFF}$ applied during a period in which some of the scanning electrodes 3 corresponding to the pixels desired to be held in the light transmitting state is of an effective voltage E and of a bipolar rectangular wave matched in phase with the scanning signal $X_{ON}$.

Since each of the pixels at respective points of intersection between the scanning and signal electrodes 3 and 4 is applied with a voltage between the scanning electrodes 3 and the signal electrodes 4, some of the pixels at the respective points of intersection between the selected scanning electrode 3 (i.e., some of the scanning electrodes 3 to which the scanning signal $X_{ON}$ is applied) and some of the signal electrodes 4 to which the signal $Y_{ON}$ is applied are applied with a voltage of a waveform shown by A1 in FIG. 4. In other words, the applied voltage is of a bipolar rectangular wave having the effective voltage aE. On the other hand, some of the pixels at the respective points of intersection between the selected scanning electrodes 3 and some of the signal electrodes 4 to which the signal $Y_{OFF}$ is applied are applied with a voltage of a bipolar rectangular wave having an effective voltage $(a-2)E$ (which may be equal to E if a is 3) as shown by A2 in FIG. 4.

Similarly, some of the pixels at the respective points of intersection between the non-selected scanning electrodes 3 (i.e., some of the scanning electrodes 3 to which the scanning signal $X_{OFF}$ is applied) and some of the signal electrodes 4 to which the signal $Y_{ON}$ is applied are applied with a voltage of a bipolar rectangular waveform having an effective voltage E as shown by A3 in FIG. 4, and some of the pixels at the respective points of intersection between the non-selected scanning electrodes 3 and some of the signal electrodes 4 to which the signal $Y_{OFF}$ is applied are applied with a voltage of a bipolar rectangular waveform having an effective voltage E as shown by A4 in FIG. 4.

Accordingly, when the signal $Y_{ON}$ is applied from the signal electrodes 4 relative to the selected scanning electrodes 3, the alternating voltage of an effective value aE (for example, 90 volts) is applied to the associated pixels at the respective points of intersection between the selected scanning electrodes 3 and the signal electrodes 4 to which the signal $Y_{ON}$ has been applied, or otherwise the alternating voltage of an effective value E or (a−2)E (which may be 30 volts when a is 3) is applied thereto. As hereinabove described, the application of the alternating voltage of the effective value aE results in a change in optical state of the liquid crystal layer 5 and, since when the alternating voltage of the effective value E or (a−2)E is applied the liquid crystal layer 5 retains the previous state which has been assumed before the application of such alternating voltage, only portions of the liquid crystal layer 5 aligned with some of the pixels to which the signals $X_{ON}$ and $Y_{ON}$ have been applied change from the light scattering state (OFF state) to the light transmitting state (ON state). So far as the remaining pixels are concerned, the remaining pixels remain the previous state, that is, in the light scattering state (OFF state) as hereinbefore described.

It is to be noted that, in the practice of the illustrated embodiment of the present invention, although the signal applied to each of the signal electrodes during the above described writing operation is reversed in polarity for each picture as is the case with the signal applied during the erasing operation, the reversion of the polarity of the signal applied during the writing operation may not be always essential.

FIG. 5 is a diagram used to describe a display operation, wherein FIG. 5(a) shows a waveform of the voltage applied to the pixel P shown in FIG. 1 and FIG. 5(b) shows a change in light transmissivity of the pixel P. FIG. 5 is applicable where the state of the pixel P is reversed. Referring to FIG. 5, since the direct current voltage of a high value aE is applied during the erasing period T31, the light transmissivity abruptly decreases during this period as indicated by b1, rendering the pixel to assume the light scattering state (white clouded state). During this period T31, there is no possibility that the light transmissivity may temporarily increase during the course in which the pixel is getting white clouded, because no change occurs in the polarity of the applied voltage.

When the writing period T32 starts following the erasing period T31, the bipolar rectangular wave of the effective voltage E is applied to the pixel P during a period T34 prior to the timing at which the scanning electrode 3a is selected and, during this period, the pixel P is retained in the light scattering state. Also, during a period T33 in which the scanning electrode 3a is selected, the bipolar rectangular wave of the high effective voltage aE is applied to the pixel P. Accordingly, as indicated by b2 in FIG. 5(b), the light transmissivity of the pixel P increases accompanied by a reversion of the state of the pixel P to the light transmitting state. A period T35 following the period T33 represents a period during which the other scanning electrodes 3 are selected and, during this period, the bipolar rectangular wave of the effective voltage E is applied to the associated pixels and, consequently, such pixels are retained in the previously assumed light transmitting state.

A display of one picture completes during one frame period F1 including the periods T31 and T32 and, during the next succeeding frame period F2 following the period T32, the next succeeding picture can be displayed. This next succeeding frame period F2 includes an erasing period T41 and a writing period T42. During the erasing period T41, signals of respective waveforms shown by the phantom line in FIG. 3 are applied to the scanning electrode 3a and the signal electrode 4a. In other words, the signal having respective polarities reversed to those during the period T31 are applied to the scanning electrode 3a and the signal electrode T41 and, consequently, the polarity of the voltage applied to the pixel P is also reversed. During this period T41, since the direct current voltage (Voltage −aE) is applied, there is no possibility that the light transmisivity may temporarily increase while the pixel P is getting white clouded, as is the case during the period T31.

During the writing period T42, however, the signals having their polarities reversed to those during the writing period T32 for the previous picture display are applied to the scanning and signal electrodes 3a and 4a and, therefore, the alternating voltage having a polarity opposite to that during the period T32 is applied to the pixel P during the writing period T42. Needless to say, in order to render the pixel P to be in the light scattering state, the waveform of the voltage applied to the pixel P during the period T43 in which the scanning electrode 3a is selected represents a bipolar rectangular waveform having an effective voltage E and, therefore, the state of the pixel P is retained. During a period following the period T42, a voltage of a waveform similar to that during any one of the periods T31 and T32 is applied to the pixel P.

Thus, according to the foregoing embodiment of the present invention, an erasure of a displayed picture by initializing all of the pixels forming the display screen to the light scattering state can be accomplished by applying to the pixels the direct current voltage which does not vary during the entire period in which this erasing operation is carried out. Accordingly, there is no possibility that any temporary increase of the light transmissivity occurs during the erasing period, permitting an efficient change to the light scattering state to take place. Therefore, a display contrast can be increased considerably. On the other hand, since the waveform of the signal applied to the pixels is reversed in polarity for each picture, a successive display of a plurality of consecutive pictures may be said to be accomplished by an alternating current drive and, therefore, any undesirable electrolysis of liquid crystal molecules forming the liquid crystal layer 5 can be advantageously avoided. Also, since the present invention permits the use of the rectangular waves for the drive signal, a drive circuit can be manufactured simple in structure and low in manufacturing cost.

It is to be noted that, if the above described constant a is chosen to be of a value approximate to 3, the voltage to be applied to the pixels for changing the optical state thereof will be twice to three times the voltage applied to the pixels for maintaining the optical state. Therefore, it is possible to apply a voltage lower than a threshold value required to achieve the change in optical state to some of the pixels whose optical state is desired to be maintained and to apply a higher voltage to some of the pixels whose optical state is desired to be changed, so that the change in optical state can be completed quickly in a short time.

Figure 6:
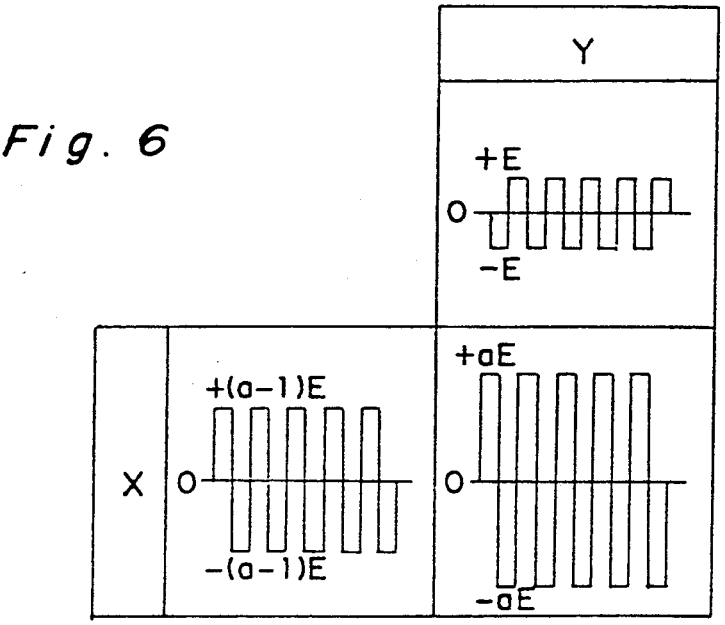
FIGS. 6 and 7 are diagrams similar to FIGS. 3 and 4, respectively, showing the driving method according to a different embodiment of the present invention.
Figure 7:
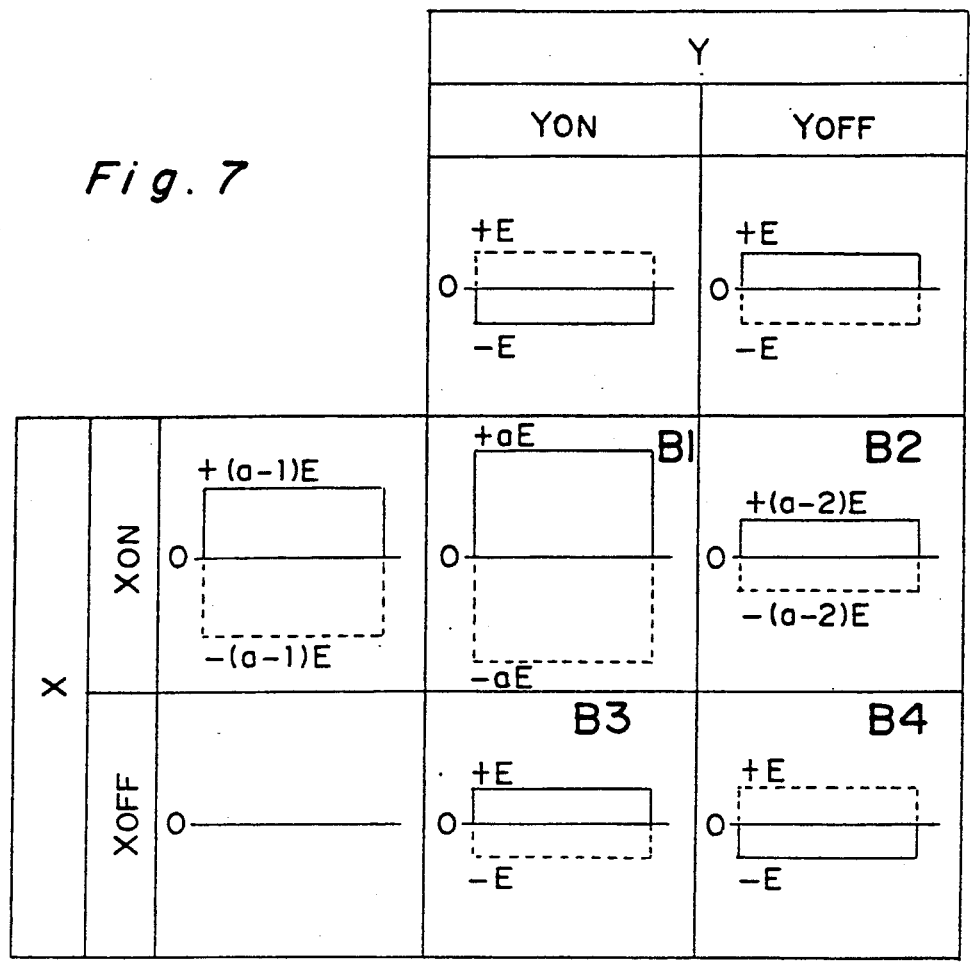

FIGS. 6 and 7 pertains to a second preferred embodiment of the present invention and illustrate various waveforms used to describe the operation of the liquid crystal display device. In describing the second preferred embodiment of the present invention, reference is also made to FIG. 1. According to the second embodiment of the present invention, however, the erasure of the displayed picture is carried out by initializing all of the pixels, forming the display screen, to the light transmitting state and the writing of a display is carried out by reversing the pixels selectively into the light scattering state with respect to the initialized display screen. In other words, according to the second embodiment of the present invention, a display substantially reverse to that accomplished according to the foregoing embodiment of the present invention can be accomplished. It is to be noted that, in the subsequent description of the second embodiment of the present invention, the light transmitting state and the light scattering state are referred to as the OFF state and the ON state, respectively.

Referring now to FIG. 6, there is shown the waveforms of signals applied to the scanning and signal electrodes 3 and 4 during the erasing operation, in a manner substantially similar to FIG. 3. Specifically, the scanning electrodes 3 are applied equally with a bipolar rectangular wave of an effective voltage (a−1) having a sufficiently high frequency (for example, 1 kHz) as shown in a row X, and the signal electrodes 4 are applied equally with a bipolar rectangular wave of an effective voltage E and opposite in polarity to that of the signal applied to the scanning electrodes 3, as shown in a column Y. Therefore, all of the pixels forming the display screen can be applied with a bipolar rectangular wave of an effective voltage aE having a sufficiently high frequency as shown at an intersection between the row X and the column Y in FIG. 6 and, accordingly, all of the pixels are held in the light transmitting state (OFF state). The waveform of each of the signals may be reversed for each picture and may be either of a type shown in FIG. 6 or of a type reverse to the signal shown in FIG. 6 during a display erasure.

FIG. 7 illustrates waveforms of signals applied respectively to the scanning and signal electrodes 3 and 4 during the writing operation, in a manner substantially similar to FIG. 4. The plural scanning electrodes 3 are line-sequentially selected, and the selected scanning electrodes 3 are applied with a signal $X_{ON}$ which is a direct current voltage having a constant voltage (a−1)E or −(a−1)E over the entire period of selection. On the other hand, the non-selected scanning electrodes are applied with a signal $X_{OFF}$ of zero volt which does not vary.

Considering the scanning electrodes 3 to which the signal $X_{ON}$ is applied, some of the signal electrodes 4 corresponding to some of the pixels which are partly formed by those scanning electrodes 3 and which are desired to be brought into the ON state are applied with the signal $Y_{ON}$ and the remaining signal electrodes 4 corresponding to the remaining pixels are applied with the signal $Y_{OFF}$. The signal $Y_{ON}$ is a direct current voltage opposite in polarity to that of the signal $X_{ON}$ and having a voltage −E or E. The signal $Y_{OFF}$ is a direct current voltage matched in polarity with that of the signal $X_{ON}$ and having a voltage E or −E.

In the pixels corresponding to the selected scanning electrodes 3, each of the pixels to which the signal $Y_{ON}$ is applied from the associated signal electrode 4 is applied with a direct current voltage of a value aE or −aE as shown by B1 so that the pixel can assume the light scattering state (ON state). Similarly, each of the pixels to which the signal $Y_{OFF}$ is applied from the associated signal electrode 4 is applied with a direct current voltage of a value (a−2)E or −(a−2)E ((a−2)E=E when a =3) as shown by B2 so that the pixel can retain the previously assumed state, i.e., the light transmitting state (OFF state).

On the other hand, in the pixels corresponding to the non-selected electrodes 3, the pixels are applied with direct current voltages of respective values E or −E as shown by B3 and B4 and, therefore, the associated pixels retain the previously assumed state.

Each of the signals $X_{ON}$, $X_{OFF}$, $Y_{ON}$ and $Y_{OFF}$ is of a waveform as shown by the solid line in FIG. 7 during a period in which a certain picture is displayed, and is of a waveform as shown by the phantom line in FIG. 7, which is reverse in polarity to the waveform shown by the solid line, during a subsequent period in which the next succeeding picture is displayed.

FIG. 8 is a diagram used to explain the operation with a particular pixel taken into consideration, wherein FIG. 8(a) illustrates a waveform of the voltage applied to the pixel P at the point of intersection between the scanning and signal electrodes 3a and 4a shown in FIG. 1 during the writing operation, and FIG. 8(b) illustrates a change in light transmissivity.

A display of one picture is carried out during a single frame period F11 including an erasing period T51 and a writing period T52. During the erasing period T51, a bipolar rectangular wave of an effective voltage aE having a high frequency is applied and the light transmissivity therefore increases as indicated by c1 to render the pixel P to assume the light transmitting state (OFF state). During the writing period T52, although the scanning electrodes 3 are selected line sequentially, the waveform of a signal then used is that in which no voltage vary during the selection of one scanning electrode 3 (that is, the cycle of which is twice the length of time during which one scanning electrode is selected). Accordingly, the pixel P is applied with a direct current voltage, the voltage aE of which does not vary over the period T53, included in the period T52, in which the scanning electrode 3a is selected. Accordingly, during this period T53, the light transmissivity abruptly decreases as indicated by c2 with no possibility of a temporary increase of the light transmissivity.

During the subsequent frame period F12 following the period T52, a display of the next succeeding picture takes place. However, the waveforms of the signal applied during this period are of a polarity reverse to those applied during the respective periods T51 and T52 as hereinbefore discussed.

Thus, according to the second preferred embodiment of the present invention, when the pixels are selectively brought into the light scattering state to accomplish a writing of a display content, some of the pixels whose optical states are to be reversed can be applied with the direct current voltage of the non-variable value aE or −aE during the selection of the scanning electrodes corresponding to such pixels and, accordingly, there is no possibility that the light transmissivity may exhibit a temporary increase during the course of change from the light transmitting state to the light scattering state, making it possible to increase the display contrast. Also, since the rectangular wave is used, the driving circuit can be manufactured simple in structure.

In addition, since the waveforms of the signals are reversed for each picture to be displayed, a successive display of a plurality of consecutive pictures may be said to be accomplished by an alternating current drive and, therefore, any undesirable electrolysis of liquid crystal molecules forming the liquid crystal layer 5 can be advantageously avoided.

Figure 9:
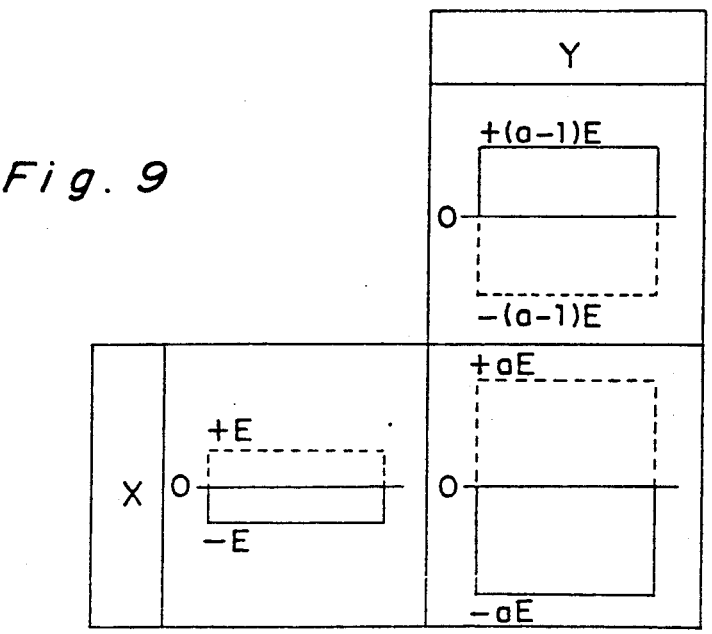
FIGS. 9 and 10 are diagrams similar to FIGS. 3 and 4, respectively, showing the driving method according to a further embodiment of the present invention.
Figure 10:
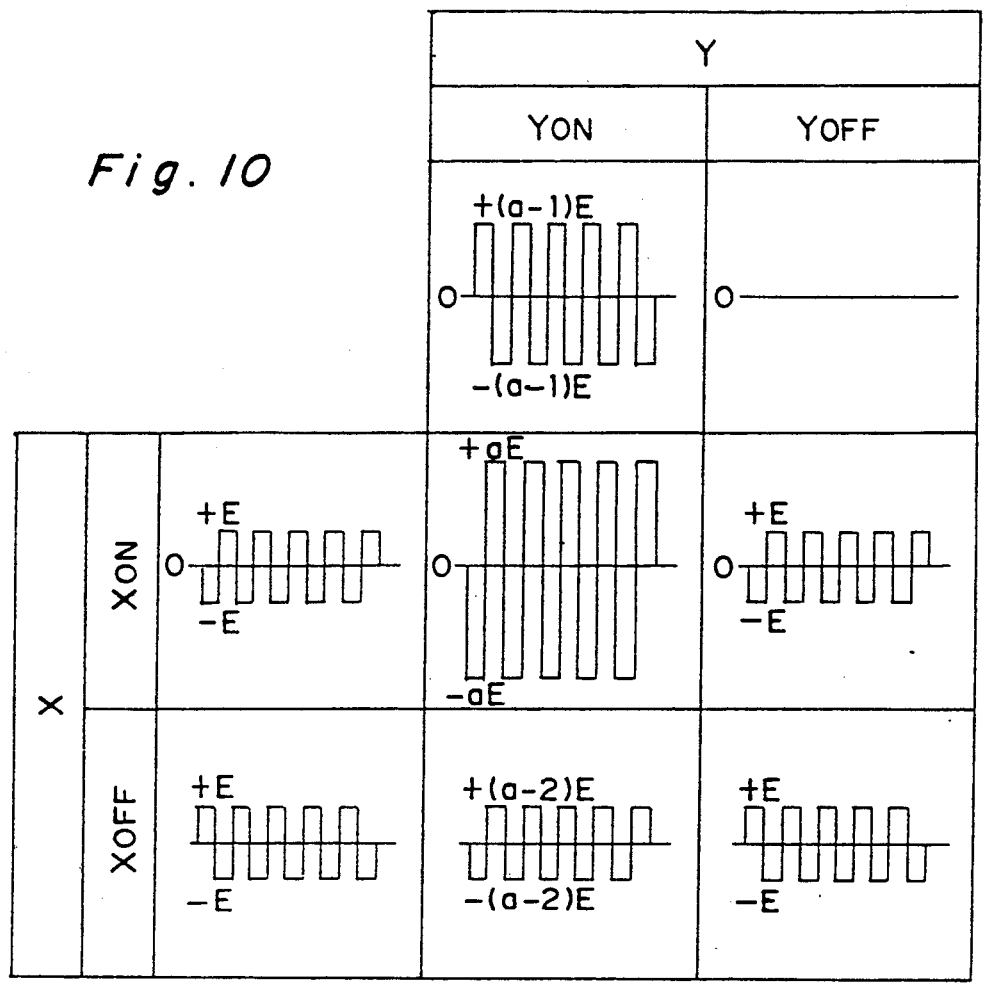

FIGS. 9 and 10 pertains to a third preferred embodiment of the present invention and illustrate various waveforms used to describe the operation of the liquid crystal display device. Specifically, FIG. 9 illustrates the waveforms of the signals used during the erasing operation, which waveforms are shown in a fashion substantially similar to those of FIG. 3, and FIG. 10 illustrates the waveforms of the signals used during the writing operation, which waveforms are shown in a fashion substantially similar to those of FIG. 4.

As can be understood from a comparison between FIG. 3 and FIG. 9 and also between FIG. 4 and FIG. 10, the waveforms of the signals applied to the scanning and signal electrodes 3 and 4 in the practice of the third embodiment of the present invention are those interchanged with the respective waveforms of the signals applied to the scanning and signal electrodes 3 and 4 used in the first embodiment of the present invention shown in and described with reference to FIGS. 1 to 5. Even the third embodiment of the present invention can bring about effects similar to those afforded by the first embodiment of the present invention.

Figure 11:
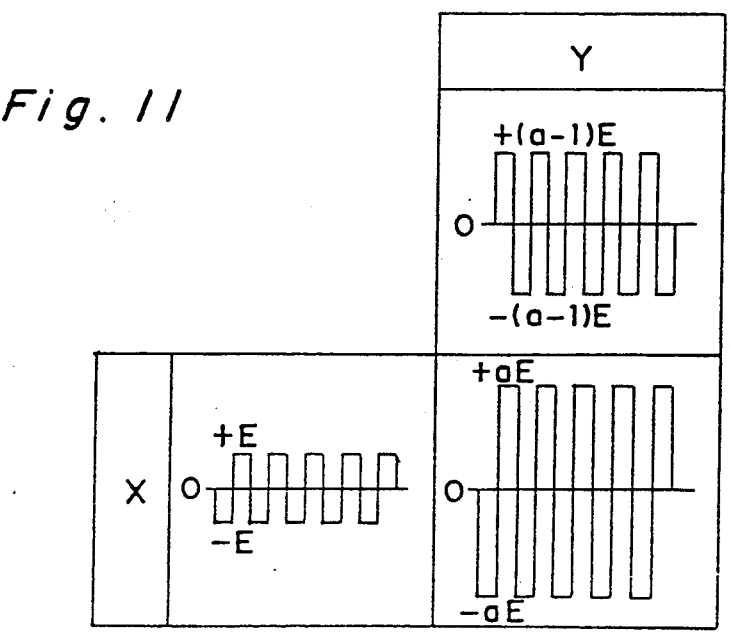
FIGS. 11 and 12 are diagrams similar to FIGS. 3 and 4, respectively, showing the driving method according to a still further embodiment of the present invention.
Figure 12:
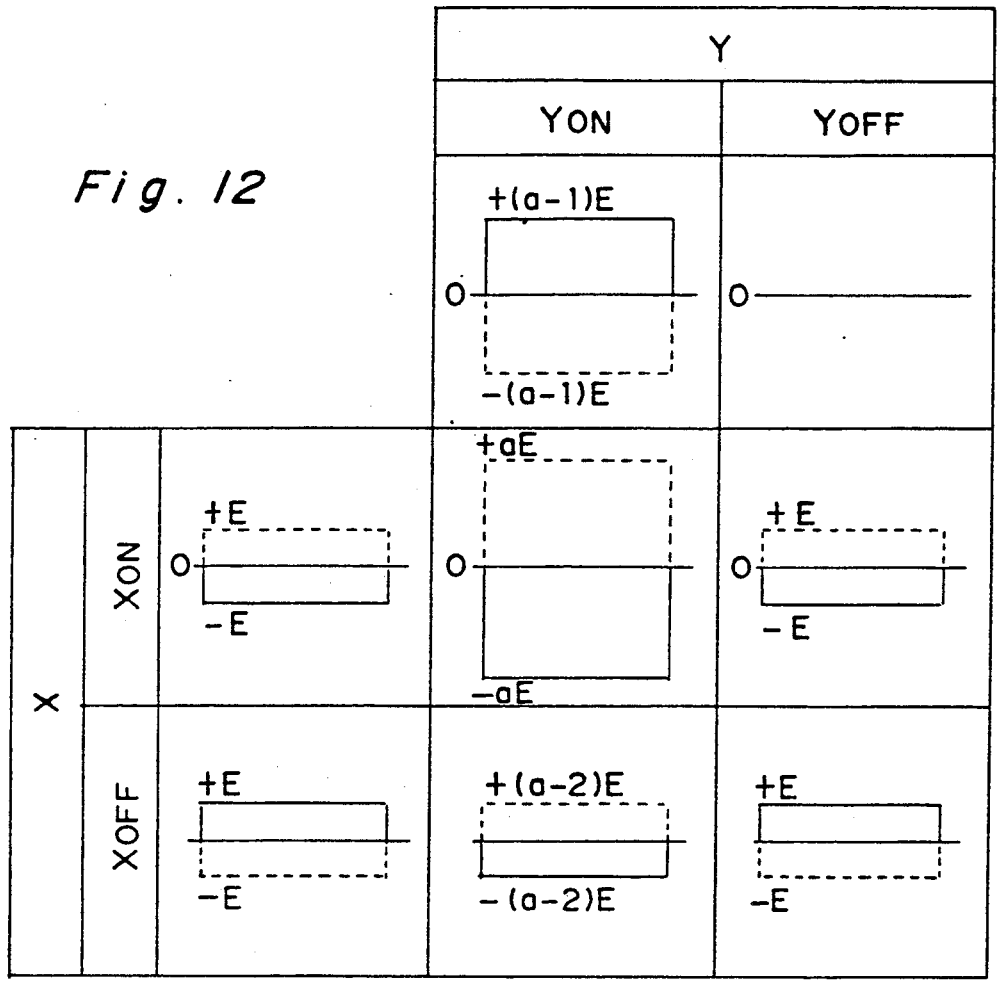

FIGS. 11 and 12 pertains to a fourth preferred embodiment of the present invention and illustrate various waveforms used to describe the operation of the liquid crystal display device, wherein FIG. 11 illustrates the waveforms of the signals used during the erasing operation and FIG. 10 illustrates the waveforms of the signals used during the writing operation. The waveforms shown in FIGS. 11 and 12 are depicted in a fashion substantially similar to those in FIGS. 6 and 7, respectively.

As can be understood from a comparison between FIG. 6 and FIG. 11 and also between FIG. 7 and FIG. 12, the waveforms of the signals applied to the scanning and signal electrodes 3 and 4 in the practice of the fourth embodiment of the present invention are those interchanged with the respective waveforms of the signals applied to the scanning and signal electrodes 3 and 4 used in the second embodiment of the present invention shown in and described with reference to FIGS. 6 to 8. Even the fourth embodiment of the present invention can bring about effects similar to those afforded by the second embodiment of the present invention.

The present invention may not be always limited to the foregoing embodiments and may be varied in numerous ways. By way of example, although in any one of the foregoing embodiments the bipolar rectangular wave having the value varying on both sides with respect to the zero volt value has been described as applied to each of the scanning and signal electrodes 3 and 4, the signal to be applied to each of the scanning and signal electrodes 3 and 4 may not be always bipolar, that is, may not be of a polarity varying towards a negative side and also towards a positive side with respect to the zero volt value, and a signal of a waveform obtained by superimposing the signal shown in FIGS. 3, 4, 6, 7 and 9 to 12 on the predetermined direct current voltage may be applied to each of the scanning and signal electrodes 3 and 4. Even in such case, the liquid crystal layer can be applied with the bipolar rectangular wave. Also, the waveform of the signal may not be always limited to a rectangular shape, but may be a sine wave or any other suitable wave provided it can satisfy the required conditions.

Furthermore, in the foregoing embodiments, the display period during which one picture is displayed has been described as including the erasing period and the writing period, a retaining period may be provided between the erasing and writing periods during which an alternating current voltage of a relatively low effective value or a relatively low direct current voltage is applied to all of the pixels so that each pixel can retain the previously assumed state.

Moreover, the mixture of the liquid crystal of a high molecular weight with the liquid crystal of a low molecular weight may be of any suitable kind provided that the state thereof can be changed by a switching of the frequency and that it may have a memory effect by which the adjustment of the applied voltage allows the previously assumed state to be retained for a length of time greater than a predetermined value.

Hereinafter, in accordance with a fifth preferred embodiment of the present invention, a method of driving a matrix-type liquid crystal display device wherein the liquid crystal layer is prepared from the previously discussed mixture and which utilizes a memory effect of the previously discussed mixture will be described.

This driving method includes an erasing operation in which the entire display screen is initialized to render it in either a light transmitting state or a light scattering state, and a writing operation in which the optical state of each of the pixels forming the erased display screen is selectively reversed to accomplish a writing of a display content. During the writing operation in this suggested embodiment, for example, the plural scanning electrodes are line-sequentially selected and a bipolar rectangular wave of an effective voltage $(a-1)E$ (for example, $a=3$ and $E=30$ volts) is applied to the selected scanning electrodes while no voltage is applied to the non-selected scanning electrodes. Also, in the plural signal electrodes disposed on one side of the liquid crystal layer opposite to the scanning electrodes so as to extend perpendicular to the scanning electrodes, some of the signal electrodes which correspond to some of the pixels of which optical state is desired to be changed in the selected scanning electrodes are applied with a bipolar rectangular wave of an effective voltage $E$ and having a phase opposite to that of the scanning wave, whereas some of the signal electrodes which correspond to some of the pixels of which optical state is to be retained are applied with the bipolar rectangular wave of an effective voltage $E$ and having a phase matched with that of the scanning wave. The voltage applied to each of the pixels is a difference between the voltage applied to the scanning electrodes and the voltage applied to the signal electrodes. Accordingly, during the writing operation, so far as the selected scanning electrodes are concerned, the pixels of which optical state is to be changed are applied with the bipolar rectangular wave of the effective voltage $aE$ (90 volts where $a=3$ and $E=30$) and the pixels of which optical state is to be retained are applied with the effective voltage $(a-2)E$ (30 volts where $a=3$ and $E=30$). So far as the non-selected scanning electrodes are concerned, both of the pixels corresponding to the signal electrodes to which the signal necessary to change the optical state is applied and the pixels to which the signal necessary to retain the optical state are applied with the bipolar rectangular wave of the effective voltage E (for example, 30 volts).

Consequently, in the selected scanning electrodes, only the pixels corresponding to the signal electrodes to which the signal of a wave opposite in phase to the scanning wave is applied are applied with the bipolar rectangular wave of the effective voltage aE, causing those pixels to change their optical state. On the other hand, the pixels of a combination of the signals other than those described above are applied with the effective voltage E or (a−2)E (30 volts where a=3 and E=30 volts) and the pixels in this case retains the previously assumed optical state.

By way of example, a display mode is considered in which the above described erasing operation is accomplished by bringing the entire display screen into the light scattering state and the writing operation is accomplished by reversing the optical state of each of the pixels to the light transmitting state. In this case, the erasing operation is carried out by, for example, applying to all of the scanning electrodes a wave during the above described selection, that is, a bipolar rectangular wave signal of a low frequency (for example, a direct current to 1 Hz) having an effective voltage (a−1)E, and to all of the signal electrodes a bipolar rectangular wave having an effective voltage E and opposite in phase to the wave applied to the scanning electrodes. On the other hand, the writing operation is carried out by the use of a signal of a high frequency (for example, 1 kHz) and having the above described waveform.

The operation which takes place during the above described display mode is shown in FIG. 13 wherein FIG. 13(a) illustrates a change in voltage applied to the pixel desired to be brought into the light transmitting state and FIG. 13(b) illustrate a change in light transmissivity of such pixel. A period T1 represents an erasing period and during this erasing period the bipolar rectangular wave of a low frequency having an effective voltage aE is applied to the pixels. Therefore, the light transmissivity decreases as indicated by a1 in FIG. 13(b). A period T2 represents a writing period and during this writing period a rectangular wave of a high frequency is applied to the pixels. A period T3 included in the period T2 represents a period during which some of the scanning electrodes corresponding to such pixels are selected and, during this period T3, the bipolar rectangular wave of an effective voltage aE is applied causing the light transmissivity of the pixels to increase as indicated by a2. The remaining portion of the period T2 other than the period T3 represents a period during which some of the scanning electrodes corresponding to such pixels are not selected and, in this case, the bipolar rectangular wave of an effective voltage E (or (a−2)E. In the case of FIG. 13, a=3 and (a−2)E=E.) is applied, causing the pixels to retain the previously assumed state.

The display mode wherein the erasing operation is accomplished by initializing the entire display screen to bring the latter into the light scattering state and the writing operation is accomplished by reversing the optical state of the pixels selectively to the light transmitting state can be attained by interchanging the frequency used during the erasing operation with that used during the writing operation. The operation under this display mode is shown in FIG. 14 wherein FIG. 14(a) illustrates a change in the applied voltage in a fashion similar to FIG. 13(a) and FIG. 14(b) illustrates a change in light transmissivity in a fashion similar to FIG. 13(b). In this example, a period T11 represents an erasing period and a period T12 represents a writing period and, during a period T13 included in the period T12, the state of such pixels are reversed to the light scattering state.

By the utilization of the driving method described hereinabove, a simple matrix-type liquid crystal display device utilizing the memory effect of the liquid crystal layer made of the mixture of the high molecular weight liquid crystal with the low molecular weight liquid crystal can be realized. Therefore, any increase in number of the pixels will not result in a lowering of the display contrast, making it possible to provide a liquid crystal display device of high resolution. In addition, since the mixture itself has a film forming capability and a self-retentivity, no spread of a spacer for an adjustment of cell gaps is necessary and, therefore, the manufacture is easy to accomplish. Also, as compared with the device wherein a smectic dynamic scattering liquid crystal is employed, a relatively low driving voltage is sufficient.

In the meantime, it is a general practice to apply an alternating voltage to the liquid crystal layer to drive the liquid crystal display device. This is for the purpose of avoiding any possible electrolysis of the liquid crystal material which would otherwise occur if a direct current field is applied thereto. A similar description applies even to the mixture of the high molecular weight liquid crystal with the low molecular liquid crystal and, therefore, the liquid crystal layer utilizing the mixture has to be driven by the application of an alternating voltage. On the other hand, while it is standard to use a rectangular wave for the driving signal so that the driving circuit can eventually be simplified, the AC drive with the use of the rectangular wave will result in an application of a bipolar rectangular wave to the liquid crystal layer.

On the other hand, in order for the liquid crystal layer made of the above discussed mixture to be brought into the light scattering state, an application of a voltage of a frequency low of 10 Hz is necessary. However, even where the frequency of the applied voltage is low, an abrupt change in voltage occurs at the time of reversion of the polarity so long as the rectangular wave is employed. Accordingly, during a period in which the rectangular wave of a high effective voltage aE is applied in order to bring the optical state of the liquid crystal layer into the light scattering state, the presence of a high frequency component may cause a temporary increase of the light transmissivity as indicated by a3 and a4 in FIGS. 13(b) and 14(b), respectively, at the time the polarity of the applied voltage changes, resulting in a reduction in a reversing efficiency of the optical state of the liquid crystal layer.

Hereinafter, the present invention will be demonstrated by way of examples which are not intended to limit the scope of the present invention.

EXAMPLE 1

60 parts by weight of poly-(4-cyanophenyl 4'-hexyloxbenzoate methylcyloxane, 40 parts by weight of E63 manufactured and sold by Merc, Japan, Inc., and a slight quantity of tetraethyl ammonium bromide were mixed together to provide a mixture. This mixture was subsequently sandwiched between a pair of transparent electrode films which have been patterned by the use of any known etching technique, thereby completing a simplified matrix-type, 16×16 dot liquid crystal display device having a film thickness of 10 microns. This liquid crystal display device was driven by the use of the driving method shown in and described with reference to FIGS. 6 to 8.

The erasure of a displayed content was carried out by applying to all of the pixels an alternating voltage of 90 volts in effective voltage having a frequency of 1 kHz and the writing of a display content was carried out by applying a direct current voltage of 90 volts (a=3 and E=30). Also, the displayed picture subsequent to the writing was retained by the application of an alternating voltage of 30 volts in effective voltage.

As a result thereof, the writing of one scanning line was accomplished in 2 seconds and the writing of one picture completed in 32 seconds. As to the retaining operation, the retention of the state at the time of completion of the writing was confirmed.

EXAMPLE 2

60 parts by weight of poly-(4-cyanophenyl 4'-hexyloxbenzoate methylcyloxane, 40 parts by weight of E63 manufactured and sold by Merc, Japan, Inc., and a slight quantity of tetraethyl ammonium bromide were mixed together to provide a mixture. This mixture was subsequently sandwiched between a pair of transparent electrode films which have been patterned by the use of any known etching technique, thereby completing a simplified matrix-type, 16×16 dot liquid crystal display device having a film thickness of 10 microns. This liquid crystal display device was driven by the use of the driving method shown in and described with reference to FIGS. 1 to 5.

The erasure of a displayed content was carried out by applying to all of the pixels a direct current voltage of 90 volts the writing of a display content was carried out by applying an alternating voltage of 90 volts in effective voltage having a frequency of 1 kHz. Also, the displayed picture subsequent to the writing was retained by the application of an alternating voltage of 30 volts in effective voltage.

As a result thereof, the writing of one scanning line was accomplished in 2 seconds and the writing of one picture completed in 32 seconds. As to the retaining operation, the retention of the state at the time of completion of the writing was confirmed. In this example, a higher contrast display than that observed in the Example 1 above could be achieved.

Thus, according to the driving method for driving the liquid crystal display device of the present invention, the drive of the matrix-type liquid crystal display device can be accomplished by a combination of the erasing operation for erasing the entire display screen and the writing operation for writing an image into the erased display screen and with the use of the liquid crystal layer having a memory effect and utilizing the mixture prepared from the liquid crystal of a high molecular weight and the liquid crystal of a low molecular weight. Accordingly, it is possible to manufacture tothe inexpensive matirx-type liquid crystal device utilizing the liquid crystal layer having the memory effect.

Also, since the liquid crystal material comprising the mixture of the high molecular weight liquid crystal and the low molecular liquid crystal has a self-retentivity, no spread of a spacer onto a substrate for an adjustment of cell gaps such as required where a liquid crystal material in a liquid form is employed is required, making it possible to provide the matrix-type liquid crystal display device having a relatively large surface area.

Furthermore, according to the driving method for the liquid crystal display device of the present invention, when during the erasing operation or during the writing operation the optical state of each pixel is desired to be reversed from the light transmitting state to the light scattering state, the direct current voltage which does not vary at least during a period in which the optical state is to be reversed is applied. Accordingly, the polarity of the voltage applied to each pixel during the course of reversion from the light transmitting state to the light scattering state does not vary and, therefore, any undersirable temporary increase of the light transmissivity which is apt to occur during such period can be avoided advantageously. In this way, the erasure or writing of the display content can be accomplished efficiently and, therefore, not only can the display contrast be increased, but the display quality can also be increased.

It is to be noted that, since the above described direct current voltage is reversed in polarity for each picture to be displayed, the AC drive can be achieved simultaneously, making it possible to avoid any possible electrolysis of the liquid crystal molecules.

Although the present invention has been described in connection with the various embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A driving method of driving a matrix-type liquid crystal display device which comprises a liquid crystal layer made of a mixture of liquid crystal of a high molecular weight with liquid crystal of a low molecular weight and capable of assuming one of a light transmitting state, when an alternating voltage of an effective value higher than a predetermined voltage and having a frequency higher than a predetermined value is applied thereto, and a light scattering state when either an alternating voltage of an effective value higher than the predetermined voltage and having a frequency not higher than the predetermined value or a direct current voltage of a value higher than the predetermined value is applied thereto, said liquid crystal layer capable of retaining at least for a predetermined length of time one of the light transmitting and scattering states, which has previously been assumed, when a voltage not higher than the predetermined value is applied thereto; a plurality of scanning electrodes and a plurality of signal electrodes positioned on respective sides of the liquid crystal layer so as to extend generally perpendicular to each other while sandwiching the liquid crystal layer therebetween; and a pixel formed at a point of intersection between each of the scanning electrodes and each of the signal electrodes and capable of assuming a light transmitting state or a light scattering state to accomplish a display when signals of predetermined waveforms are applied to the associated scanning and signal electrodes, said method comprising the steps of:

erasing the display by applying either the alternating voltage of the effective value higher than the predetermined voltage or the direct current voltage higher than the predetermined value to all of the pixels to bring an entire display screen in either a light transmitting state or a light scattering state;

writing the display by applying a scanning signal of a predetermined waveform while line sequentially selecting the plural scanning electrodes and also by applying a signal of a waveform effective to apply to each of the signal electrodes either the alternating voltage of the effective value higher than the predetermined voltage or the direct current voltage, higher than the predetermined value to the liquid crystal layer by a relationship between the signal to be applied to the signal electrodes and the scanning signal during a period in which some of the scanning electrodes corresponding to some of the pixels of which optical state is to be changed are selected, but applying a signal of a waveform effective to apply to each of the signal electrodes either the alternating voltage of the effective value not higher than the predetermined voltage or the direct current voltage not higher than the predetermined value to the liquid crystal layer by the relationship between the signal to be applied to the signal electrodes and the scanning signal during a period in which some of the scanning electrodes corresponding to some of the pixels of which optical state is to be retained are selected, thereby to selectively vary respective optical states of the pixels forming the display screen; and causing each of the pixels to retain the previously assumed state by applying either the alternating voltage of the effective value not higher than the predetermined value or the direct current voltage not higher than the predetermined value to all of the pixels;

wherein one of a voltage wave applied to each of the pixels during the erasing step and a voltage wave applied to some of the pixels of which optical state is to be changed during the writing step has a frequency higher than the predetermined value and the other of the voltage waves has a frequency not higher than the predetermined value.

2. The method as claimed in claim 1, wherein each of the voltage to be applied to the pixels during the erasing step and the voltage to be applied to some of the pixels of which optical state is changed during the writing step is preferably of a value twice to three times the voltage applied to the pixels during the causing step or the voltage applied to such some of the pixels of which optical state is retained during the writing step.

3. A method of driving a matrix-type liquid crystal display device which comprises a liquid crystal layer made of a mixture of liquid crystal of a high molecular weight with liquid crystal of a low molecular weight and capable of assuming one of a light transmitting state, when an alternating voltage of an effective value higher than a predetermined voltage and having a frequency higher than a predetermined value is applied thereto, and a light scattering state when either an alternating voltage of an effective value higher than the predetermined voltage and having a frequency not higher than the predetermined value or a direct current voltage of a value higher than the predetermined value is applied thereto, said liquid crystal layer capable of retaining at least for a predetermined length of time one of the light transmitting and scattering states, which has previously been assumed, when a voltage not higher than the predetermined value is applied thereto; a plurality of scanning electrodes and a plurality of signal electrodes positioned on respective sides of the liquid crystal layer so as to extend generally perpendicular to each other while sandwiching the liquid crystal layer therebetween; and a pixel formed at a point of intersection between each of the scanning electrodes and each of the signal electrodes and capable of assuming a light transmitting state or a light scattering state to accomplish a display when voltage signals are applied to the associated scanning and signal electrodes, said method comprising the steps of:

applying between the scanning and signal electrodes either the alternating voltage of the effective value higher than the predetermined voltage or the direct current voltage higher than the predetermined value to bring all of the pixels into either a light transmitting state or a light scattering state thereby to erasure an entire display screen; and writing the display by applying a scanning signal of a predetermined waveform while line sequentially selecting the plural scanning electrodes and also by applying a signal of a waveform effective to apply to each of the signal electrodes either the alternating voltage of the effective value higher than the predetermined voltage or the direct current voltage higher than the predetermined value to the liquid crystal layer by a relationship between the signal to be applied to the signal electrodes and the scanning signal during a period in which some of the scanning electrodes corresponding to some of the pixels of which optical state is to be changed are selected, but applying a signal of a waveform effective to apply to each of the signal electrodes either the alternating voltage of the effective value not higher than the predetermined voltage or the direct current voltage not higher than the predetermined value to the liquid crystal layer by the relationship between the signal to be applied to the signal electrodes and the scanning signal during a period in which some of the scanning electrodes corresponding to some of the pixels of which optical state is to be retained are selected, thereby to selectively vary respective optical states of the pixels forming the display screen;

causing each of the pixels to retain the previously assumed state by applying either the alternating voltage of the effective value not higher than the predetermined value or the direct current voltage not higher than the predetermined value to all of the pixels;

wherein one of a voltage wave applied to each of the pixels during the erasing step and a voltage wave applied to some of the pixels of which optical state is to be changed during the writing step has a frequency higher than the predetermined value whereas the other of the voltage waves is a direct current of a voltage which does not vary at least during the period, in which the optical state of the pixels is changed, and of a waveform varying in polarity for each picture being displayed.

4. The method as claimed in claim 3, wherein each of the voltage to be applied to the pixels during the erasing step and the voltage to be applied to some of the pixels of which optical state is changed during the writing step is preferably of a value twice to three times the voltage applied to the pixels during the causing step or the voltage applied to such some of the pixels of which optical state is retained during the writing step.

* * * * *